United States Patent [19]

Hutter, III

[11] Patent Number: 4,466,764

[45] Date of Patent: Aug. 21, 1984

[54] APPARATUS FOR SEPARATING AND LIFTING UNITS FROM A STACK

[75] Inventor: Charles G. Hutter, III, Carson City, Nev.

[73] Assignee: Physical Systems, Inc., Carson City, Nev.

[21] Appl. No.: 373,001

[22] Filed: Apr. 29, 1982

[51] Int. Cl.³ .................... B65G 59/04; B65H 5/14
[52] U.S. Cl. .................................... 414/121; 29/239; 221/211; 271/90
[58] Field of Search .............. 414/121, 120, 122, 119; 271/90, 104, 11, 14; 221/211; 294/64.1; 29/239, 252

[56] References Cited

U.S. PATENT DOCUMENTS

| | | | |
|---|---|---|---|
| 1,145,403 | 7/1915 | Cheshire | 414/121 X |
| 1,861,605 | 6/1932 | Maas | 271/104 |
| 3,176,859 | 4/1965 | Prager | 414/119 X |
| 3,599,968 | 8/1971 | Billett et al. | 271/14 |
| 3,724,687 | 4/1973 | Marschke et al. | 294/64.1 X |
| 4,091,945 | 5/1978 | Patterson | 294/64.1 X |

FOREIGN PATENT DOCUMENTS

| | | | |
|---|---|---|---|
| 2431333 | 1/1976 | Fed. Rep. of Germany | 221/211 |
| 2433128 | 1/1976 | Fed. Rep. of Germany | 414/114 |
| 846892 | 8/1960 | United Kingdom | 414/121 |

Primary Examiner—Robert J. Spar
Assistant Examiner—Janice Krizek
Attorney, Agent, or Firm—Fulwider, Patton, Rieber, Lee & Utecht

[57] ABSTRACT

Apparatus is provided for separating and lifting units, such as insulated glass window or door units, one at a time from a stack of units. The apparatus comprises a frame which supports a movably mounted suction platen for vacuum engagement with an upwardly presented surface of the uppermost unit in the stack and a push block for bearing engagement with a peripheral edge of the unit immediately below the uppermost unit. A pneumatic cylinder assembly reacts between the frame and the suction platen to displace the platen and the engaged uppermost unit with respect to the push block and the underlying units in the stack whereby the uppermost unit is separated from the underlying units. The suction platen remains in vacuum engagement with the separated unit to permit lifting and carrying thereof to an alternative location. Controls facilitating operation of the apparatus are also disclosed.

15 Claims, 14 Drawing Figures

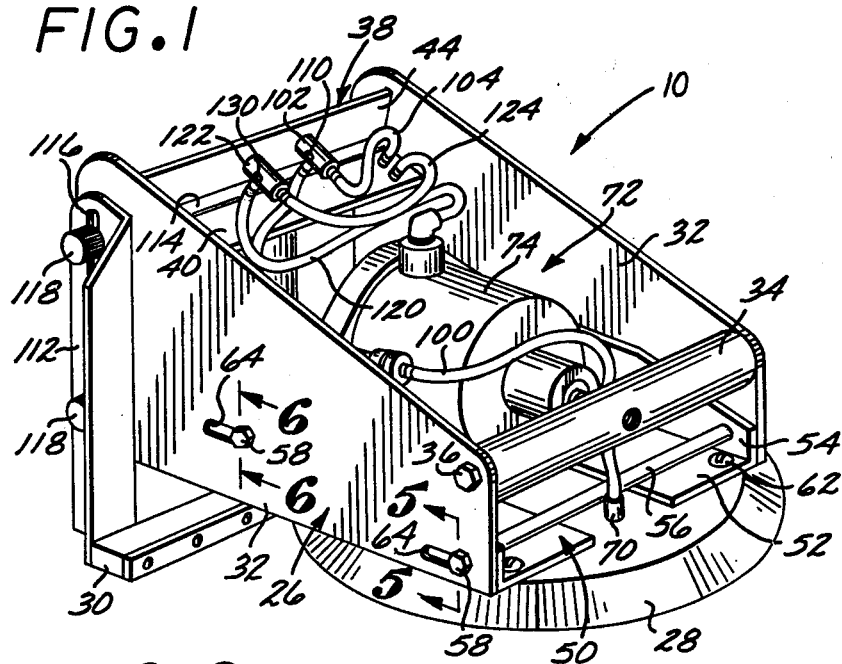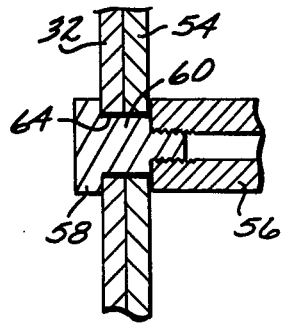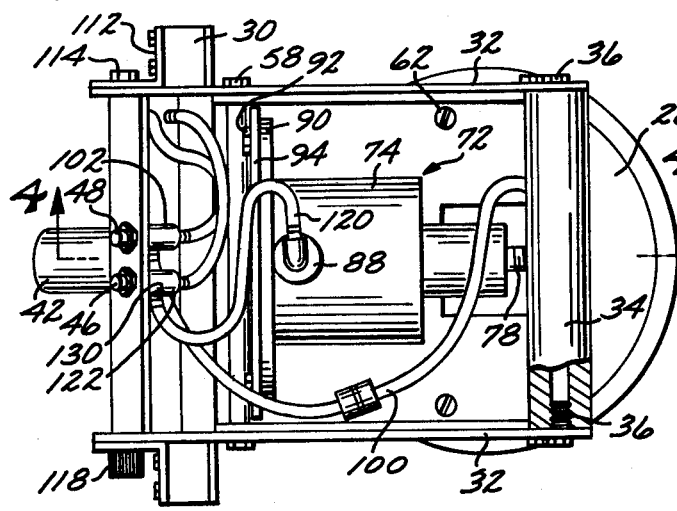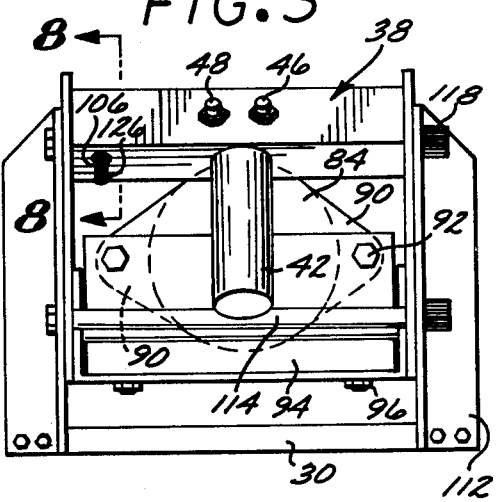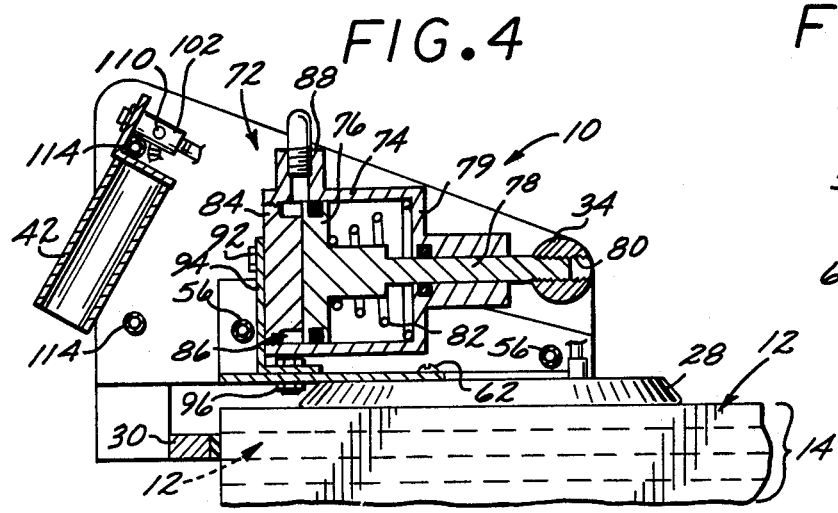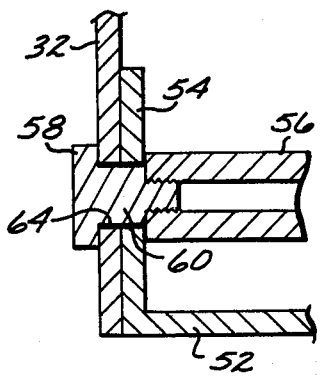

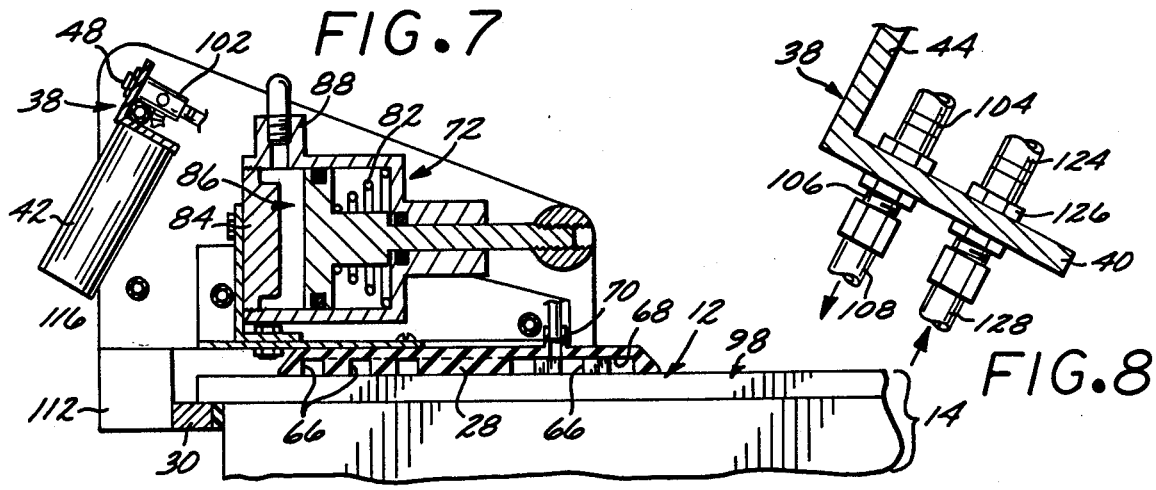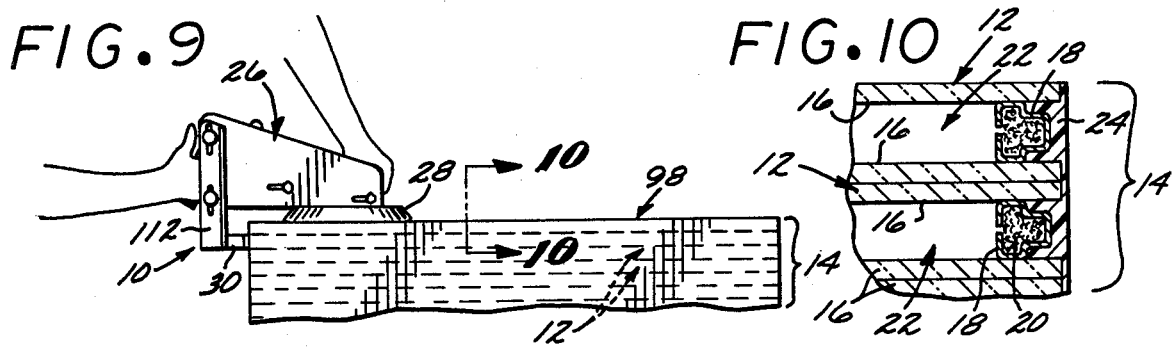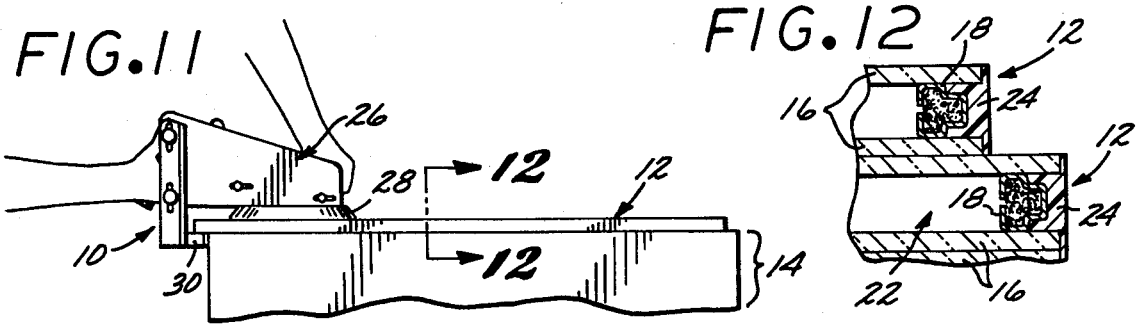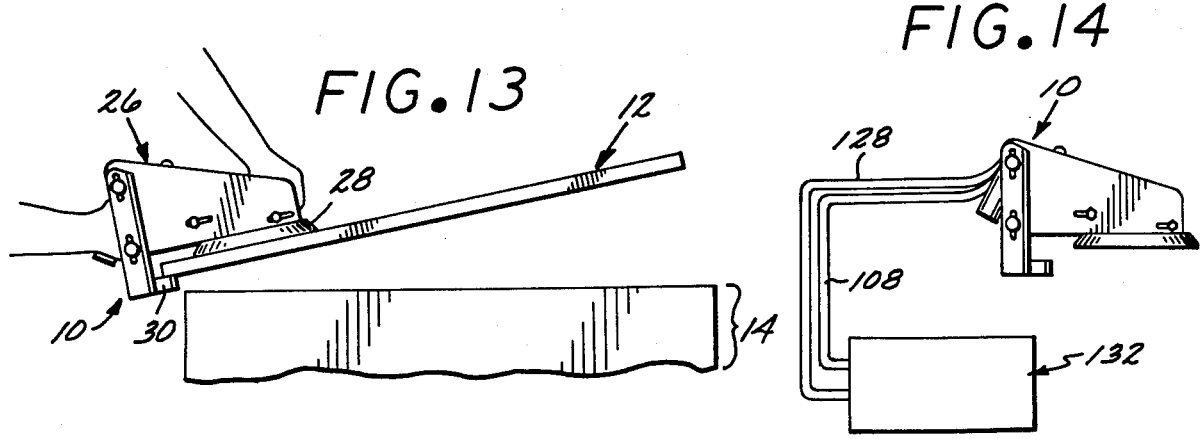

APPARATUS FOR SEPARATING AND LIFTING UNITS FROM A STACK

BACKGROUND OF THE INVENTION

This invention relates generally to equipment for separating units from a stack and for facilitating lifting and handling of those units. More specifically, this invention relates to a device particularly designed for separating and lifting units, such as relatively fragile insulated glass window or door units or the like, from a stack of units.

In many manufacturing processes, it is necessary or desirable to separate partially manufactured units or items one at a time from a stack thereof and to lift and handle those units preparatory to performance of subsequent manufacturing or assembly operations. Such separating, lifting, and handling of the units, however, can be a particularly delicate procedure when the stacked units are, for example, relatively fragile, bulky, difficult to grasp, or when the units tend to stick to one another.

By way of one specific example, insulated glass window or door units are normally manufactured by forming a stack of identical units each comprising a pair of glass panes or the like spaced from one another by a slightly inset peripheral spacer. After the stack is formed, a curable sealant and adhesive material, such as a thermosetting rubber-based composition, is applied about the periphery of the stacked units to bond the glass panes and spacer of each unit with respect to one another and to seal the volume between the glass panes against ingress of air or moisture. However, the sealant-adhesive material typically overlaps slightly the margins of adjacent units in the stack such that the units are normally stuck to one another when the sealant-adhesive material cures. As a result, it is particularly difficult to separate the units from one another for subsequent manufacturing steps, such as installation thereof into appropriate frames.

Typically, separation of the stacked units is accomplished by manually cutting the sealant-adhesive material with a razor knife or the like to free the units from each other and thereby permit them to be lifted manually from the stack. However, this cutting procedure is relatively time-consuming and hazardous to the worker and all too frequently results in errant cuts destroying the peripheral seal provided by the sealant-adhesive material. Such damage to the peripheral seal is extremely difficult to detect visually, but nevertheless constitutes a major cause of warranty claims by consumers since it permits moisture to enter the volume between the two panes of a window or door unit whereby the unit will fog up during use. Moreover, even if the sealant-adhesive material is cut properly, the fragile units are particularly cumbersome to grasp and carry to a subsequent manufacturing station.

The present invention overcomes these problems and disadvantages by providing a device for quickly and easily separating relatively fragile units, such as insulated glass window or door units, from a stack of units one at a time without damage to the units, wherein the device further facilitates handling and carrying of the units to an alternative location.

SUMMARY OF THE INVENTION

In accordance with the invention, apparatus is provided for quickly and easily separating and lifting units one at a time from a stack of units, wherein the apparatus is particularly useful in the lifting and handling of relatively fragile insulated glass window or door units or the like during manufacture thereof. The apparatus comprises a frame which supports a movable suction member for vacuum engagement with an upwardly presented surface of the uppermost unit in the stack and a push block adapted for bearing engagement with one peripheral edge of the unit immediately below the uppermost unit. The frame further supports an actuator means for selectively displacing the suction member with respect to the frame and the push block to displace and separate the vacuum-engaged uppermost unit with respect to the push block and the underlying units in the stack. By maintaining the suction member in vacuum engagement with the now-separated unit, the apparatus can be used to lift and carry the unit to a selected alternative location for further manufacture or the like.

In accordance with one preferred form of the invention, the frame comprises a pair of relatively lightweight upstanding side plates secured with respect to each other by a plurality of transversely extending brace members, wherein one of said brace members at the rear of the frame supports a handle oriented for easy grasping by the individual operating the apparatus. A relatively lightweight carriage is supported by the frame for generally horizontal movement relative thereto in the fore-aft direction within prescribed limits, and this carriage in turn supports the suction member in the form of a downwardly presented suction platen. The actuator means comprises a pneumatic cylinder assembly having one end secured to a brace member at the front of the frame and its other end secured to the movable carriage for displacing the carriage and the suction platen through its range of horizontal travel with respect to the frame.

The push block extends transversely beneath the frame at a position generally to the rear of the suction platen. This push block is supported by a pair of upstanding struts secured respectively to the frame side plates by fasteners, such as bolts or the like, which can be received through vertically elongated slots in the upstanding struts to permit a range of vertical adjustment in the position of the push block.

In use, the unit separating and lifting apparatus is associated with a stack of units with the suction platen bearing against an upwardly presented surface of the uppermost unit in the stack and with the push block bearing against one peripheral edge of the unit immediately below the uppermost unit. Control means is operable to couple a vacuum to the suction platen thereby bringing the platen into vacuum engagement with the uppermost unit. The control means is further operable to supply a selected pneumatic signal to the pneumatic cylinder assembly for displacing the carriage and the suction platen in a horizontal direction generally toward the push block to separate the uppermost unit from the underlying units in the stack. By maintaining the vacuum engagement with the now-separated unit, the apparatus can be used to lift and carry the separated unit to a selected alternative location whereupon the vacuum can be interrupted thereby releasing the separated unit from the apparatus.

Other features and advantages of the present invention will become more apparent from the following detailed description, taken in conjunction with the accompanying drawings, which illustrate, by way of example, the principles of the invention.

BRIEF DESCRIPTION OF THE DRAWINGS

The accompanying drawings illustrate the invention. In such drawings:

FIG. 1 is a perspective view illustrating a unit separating and lifting apparatus embodying the novel features of the invention;

FIG. 2 is a top plan view of the apparatus, with portions broken away to illustrate construction details thereof;

FIG. 3 is a rear elevation view of the apparatus;

FIG. 4 is a longitudinal vertical section of the apparatus taken generally on the line 4—4 of FIG. 2 and illustrating the apparatus in conjunction with a stack of units;

FIG. 5 is an enlarged fragmented vertical section taken generally on the line 5—5 of FIG. 1;

FIG. 6 is an enlarged fragmented vertical section taken generally on the line 6—6 of FIG. 1;

FIG. 7 is a longitudinal vertical section of the apparatus generally similar to FIG. 4, but illustrating the apparatus in an alternative position of operation;

FIG. 8 is an enlarged fragmented vertical section taken generally on the line 8—8 of FIG. 3;

FIG. 9 is a side elevation view illustrating engagement of the apparatus with a stack of units;

FIG. 10 is an enlarged fragmented vertical section taken generally on the line 10—10 of FIG. 9;

FIG. 11 is a side elevation view illustrating use of the apparatus to separate the uppermost unit from the stack of units;

FIG. 12 is an enlarged fragmented vertical section of a portion of the stack illustrating separation of the uppermost unit from underlying units in the stack;

FIG. 13 is a side elevation view illustrating use of the apparatus to lift the separated uppermost unit from the underlying stack of units; and FIG. 14 is a fragmented perspective view illustrating, somewhat in schematic form, the apparatus in combination with means providing a source of vacuum and a source of pressurized air.

DETAILED DESCRIPTION OF THE PREFERRED EMBODIMENT

As shown in the exemplary drawings, a separating and lifting apparatus designated generally by the reference numeral 10 is provided for quickly and easily separating and lifting units 12 one at a time from a stack 14 of the units. The apparatus 10 is adapted for engaging the uppermost unit in the stack and then for displacing said uppermost unit with respect to the immediately underlying unit in the stack to separate the uppermost unit from the stack. By maintaining the apparatus 10 in engagement with the uppermost unit, the apparatus can be used to lift and carry the separated unit to a selected alternative position.

The apparatus 10 of this invention is particularly useful for handling generally flat articles arranged in a stack, such as in conjunction with the performance of a variety of manufacturing processes. For example, the apparatus 10 is particularly useful in the lifting and handling of insulated glass window or door units 12, shown in the accompanying drawings, to permit the units to be separated from one another and easily handled and carried to alternative locations for performance of subsequent manufacturing processes.

More particularly, by way of one specific example, insulated glass window or door units 12 are typically manufactured, as illustrated generally in FIGS. 9—13, by assembling the components of a plurality of units 12 into a vertical stack 14. These units 12 each comprise a pair of glass panes 16 or the like wherein the pair of panes are separated by a peripheral spacer 18 of extruded aluminum or the like which is inset slightly from the peripheries of the panes 16 and which may support a desiccant material 20 or the like to absorb moisture from the volume 22 between the pair of glass panes 16.

The thus-described units are assembled in a back-to-back stacked relation, as illustrated best in FIG. 10, whereupon a suitable sealing and adhesive material 24, such as a selected curable thermosetting rubber-based composition or the like, is applied about the peripheries of the stacked units to bond each pair of panes 16 with respect to each other and with respect to the associated spacer 18. This sealant-adhesive material also functions as a gas seal to prevent ingress of moisture-laden air into the volume 22 between the panes 16 of each unit 12. However, a portion of this sealant-adhesive material 24 tends to overlie the adjacent peripheral margins of the stacked units 12 whereby the material 24, when cured, results in an undesired sticking of the units 12 with respect to each other.

The separating and lifting apparatus 10 of this invention is provided for quickly and easily separating the uppermost unit 12 in the stack from the remaining underlying units wherein this separation is accompanied by severing any portion of the sealant-adhesive material 24 tending to bond the uppermost unit with the immediately underlying unit in the stack. Importantly, however, the apparatus 10 of this invention provides such separation without damaging the gas seal provided by the peripheral sealant-adhesive material 24. Moreover, the apparatus provides a convenient and easily-operated lifting device for lifting of the separated units and carrying thereof without significant risk of dropping or breakage.

The construction and operation of the unit separating and lifting apparatus 10 of this invention is shown in detail in FIGS. 1-8. As shown, the apparatus 10 includes a frame 26 which supports a movable suction platen 28 and an adjustable push block 30. The suction platen 28 is adapted for engaging the uppermost unit 12 in the stack 14 and for displacing the uppermost unit with respect to the immediately underlying unit in the stack which is held against displacement by the push block 30. The suction platen and push block thus permit separation of the uppermost unit with respect to the remaining units in the stack whereupon the separated unit can be lifted and carried by maintaining engagement thereof with the suction platen.

The frame 26 is shown in the illustrative embodiment in the form of two upstanding side plates 32 which can be formed conveniently from a relatively lightweight material, such as aluminum sheet or the like. These side plates are secured in spaced, generally parallel relation with respect to each other by transversely extending brace members, such as a tubular tie rod 34, extending transversely between the front ends of the side plates 32 for threaded reception of mounting bolts 36 passed through the side plates and fastened into the opposite ends of the tie rod 34. A second transversely extending brace member is provided at the rear ends of the side plates 32 and is illustrated in the form of an angle bracket 38 of a generally L-shaped cross section having its opposite ends secured to the side plates as by welding or the like. This angle bracket 38 is oriented with one leg 40 projecting generally forwardly and downwardly to provide a convenient mounting base for a downwardly and rearwardly projecting hand grip 42 positioned intermediate the length of the bracket for easy grasping by a person using the device 10. The other leg 44 of the bracket 38 projects generally forwardly and upwardly and provides a convenient mounting structure for supporting various control members having buttons 46 and 48 disposed for easy engagement by the operator's thumb, wherein these control members will be described herein in more detail in conjunction with use and operation of the apparatus.

The upstanding side plates 32 of the frame 26 support therebetween a horizontally movable carriage 50 illustrated in the form of a slide plate 52 joined at opposite sides to a pair of short upstanding ribs 54 for sliding engagement against the inboard faces of the frame side plates 32. A pair of tubular guide rods 56 extend transversely between the frame ribs 54 and are internally threaded at their opposite ends, as viewed in FIGS. 5 and 6, for receiving slide bolts 58 each passed through the associated side plate 32 and rib 54 for threaded connection into the adjacent guide rod 56. Importantly, the slide bolts 58 have enlarged nonthreaded shoulders 60 interposed between their respective head and threaded shank for sliding through horizontally elongated slots 64 in the side plates 32. Accordingly, the carriage 50 is horizontally movable with respect to the side plates 32 of the frame 26 wherein the extent of this horizontal movement is controlled by the horizontal lengths of the slots 64.

The movable carriage 50 provides a mounting structure for the suction platen 28. More specifically, the suction platen 28 is fastened to the carriage as by a plurality of screws 62 or the like received downwardly through the slide plate 52 and secured into the suction platen. This suction platen 28 is thus supported at the underside of the carriage 50 in a position to extend transversely beneath the frame side plates 32 for relative engagement between the suction platen and an upwardly presented surface of an uppermost unit 12 in a stack 14 of units. In a preferred form, as shown best in FIG. 7, the suction platen is constructed of a suitable elastomeric material to include a downwardly open array of annular suction channels 66 connected to one another by a radius channel 68 which is in turn adapted for connection to a source of vacuum via an upwardly projecting fluid fitting 70, as will be described in more detail.

A pneumatic cylinder assembly 72 is mechanically coupled between the frame 26 and the movable carriage 50 to control horizontal movement of the carriage within the limits defined by the slots 64 in the side plates 32. This pneumatic cylinder assembly is illustrated in FIGS. 2-4 and 7 to include a cylinder housing 74 which slidably receives a piston 76 joined to a ram 78 projecting through a sealed end wall 79 of the housing and secured as by threading into a threaded opening 80 in the front tie rod 34. A compression spring 82 reacts between the piston 76 and the end wall 79 to urge the cylinder housing 74 in a forward direction toward the tie rod 34.

The end of the cylinder housing 74 is closed by an end cap 84 which cooperates with the piston 76 to define a pneumatic pressure chamber 86 into which pressurized air can be supplied through an inlet port 88 in the housing 74. When pressurized air is supplied through this port 88 to the pressure chamber 86, the cylinder housing 74 is urged against the force of the spring 82 in a direction away from the piston 76. Importantly, the end cap 84 includes a pair of laterally projecting flanges 90 connected by bolts 92 to an upstanding bracket 94 connected in turn by bolts 96 to the rear of the carriage slide plate 52 such that the cylinder housing movement is accompanied by a corresponding rearward movement of the carriage 50 including the suction platen 28. This rearward movement is, of course, limited by the lengths of the slots 34 in the frame side platen 32 and is reversed by action of the spring 82 when pneumatic pressure in the pressure chamber 86 is released.

In use, the apparatus 10 is placed into association with a stack 14 of units 12 by placing the suction platen 28 onto an upwardly presented surface 98 of the uppermost unit in the stack. The suction platen is then coupled to a source of vacuum (not shown in FIG. 1) by means of a vacuum tube 100 connected from the fluid fitting 70 to a vacuum switch 102 mounted on the bracket 38 at the rear of the frame 26. The vacuum switch is operated by manual depression of the button 48 associated therewith to connect the vacuum tube 100 through a short connector conduit 104 to a nipple 106 (FIG. 8) on the bracket 38 which is in turn coupled via an appropriate conduit 108 to a suitable vacuum source. Accordingly, supply of the vacuum to the suction platen 28 brings the platen into vacuum engagement with the uppermost unit in the stack. Release of the buttom 48 serves to break the vacuum connection as by opening an atmospheric port 110 on the vacuum switch 100 to uncouple the vacuum engagement between the suction platen and the uppermost unit 12.

When the suction platen 28 is placed onto the upwardly presented surface 98 of the uppermost unit 12 in the stack, the push block 30 is positioned in bearing engagement with one peripheral side of the unit in the stack immediately underlying the uppermost unit. In this regard, the push block 30 is suspended generally from the rear of the frame side plates 32 in a position to engage the peripheral edge of said underlying unit, as shown best in FIGS. 1 and 4. This push block 30 is supported at the lower ends of a pair of upstanding struts 112 which are connected to the outboard faces of the side plates 32 by a pair of transversely extending tie bolts 114. Conveniently, these struts 112 include vertically oriented adjustment slots 116 through which the tie bolts 114 are received, such that the vertical position of the push block 30 with respect to the frame 26 can be adjusted in accordance with the thickness of each unit 12 in the stack 14. To facilitate this adjustment, the tie bolts 114 are secured by means of knurled nuts 118 at one end to permit relatively easy manual loosening and retightening of the bolts 114. Conveniently, the units 12 in the stack 14 typically have a uniform thickness to permit setting of the push block 30 at one selected position without requiring further adjustment for the particular units being handled.

With the suction platen 28 in vacuum engagement with the uppermost unit 12 and the push bar 30 in bearing engagement with the peripheral edge of the immediately underlying unit, pressurized air is supplied to the pneumatic cylinder assembly 72 to separate the uppermost unit from the underlying stack. More particularly, pressurized air can be provided from a suitable source (not shown in FIG. 1) via a pressure tube 120 coupled between the port 88 on the cylinder housing 74 and a pressure switch 122 mounted on the bracket 38. The pressurized air is supplied to the pressure switch 122 via a short connector conduit 124 coupled through a nipple 126 (FIG. 8) on the bracket 38 through an appropriate conduit 128 to the pressure source.

Depression of the button 46 on the pressure switch 122 couples the pressurized air into the pressure chamber 86 within the cylinder housing 74 to cause a displacement of the cylinder housing 74 and the carriage 50 in a rearward direction relative to the frame. This displacement carries the suction platen 28 in a rearward direction to force the vacuum-engaged uppermost unit 12 to slide generally in its horizontal plane in a rearward direction toward the push bar 30. Such movement of the uppermost unit 12 is illustrated in FIGS. 7 and 11–12 and results in shear forces about the periphery of the unit sufficient to sever relatively cleanly any sealant-adhesive material 24 overlapping the peripheral boundary between the uppermost and underlying units 12 in the stack. Accordingly, supply of pressurized air to the pneumatic cylinder assembly 72 displaces the suction platen 28 to separate the vacuum-engaged uppermost unit 12 from the remaining units in the stack.

The apparatus 10 can be used further for lifting and handling of the now-separated unit 12 by maintaining the vacuum engagement between the suction platen 28 and the surface 98 of the unit. This lifting motion is illustrated in FIG. 13 whereby the unit can be handled and transported relatively easily to an alternative location for performance of subsequent manufacturing processes, such as installation of the units into appropriate frames in the case of insulated window or door units or the like. At the selected alternative location, the button 48 on the vacuum switch 102 can be depressed momentarily to interrupt the vacuum supplied to the suction platen 28 thereby releasing the platen from the unit and permitting the apparatus to be used for separating and lifting subsequent units from the stack.

The pressure within the pressure chamber 86 of the pneumatic cylinder assembly 72 is released prior to use of the apparatus for separating and lifting subsequent units. As illustrated, this pressure is released by releasing the button 46 of the pressure switch 122 thereby coupling the chamber 86 to atmosphere through a port 130 on the switch 122. This can be done at any time after separation of the unit from the stack and prior to reengagement of the apparatus with a subsequent unit. Release of the pressure, of course, permits the spring 82 within the cylinder housing 74 to return the cylinder housing and the carriage 50 to a forward position, as illustrated in FIG. 4.

As shown in FIG. 14, a pump assembly 132 can be provided for supplying a source of vacuum via the conduit 108 and a source of pressurized air via the conduit 128. This pump assembly 132 may be provided in any of a variety of forms generally known to those skilled in the art, including, for example, integrated devices or separate devices for providing pressurized air and a vacuum. In one form, the pump assembly constitutes a conventional compressor for supplying pressurized air through the conduit 128 wherein the pressurized air flows through a Venturi throat (not shown) to which the conduit 108 is coupled for supplying the source of vacuum.

The apparatus 10 of this invention thus provides a relatively simple, lightweight, and inexpensive structure for separating and lifting units one at a time from a stack of units. The apparatus is particularly useful with bulky or fragile units, such as insulated glass window or door units, and can be maintained in engagement with separated units for further facilitating handling and transporting of those units to alternative locations.

A variety of modifications and improvements to the unit separating and lifting apparatus described herein are believed to be apparent to one skilled in the art. Accordingly, no limitation on the invention is intended, except by way of the appended claims.

What is claimed is:

1. Apparatus for separating generally planar units one at a time from a stack of units, comprising:
   a frame including a pair of generally upstanding side plates connected in generally parallel relation to each other by a plurality of transversely extending brace members, said side plates each having at least one generally horizontally extending slot formed therein;
   a carriage;
   slide bolt means extending through each of said side plate slots and secured with respect to said carriage for slidably mounting said carriage for back and forth, generally horizontal displacement with respect to said frame generally within the limits of said slots;
   a suction platen mounted on said carriage for movement therewith in a position for vacuum engagement with an upwardly presented surface of the uppermost unit in the stack;
   a push block carried by said frame for bearing engagement with one peripheral edge of a unit in the stack underlying the uppermost unit;
   means for coupling a source of vacuum to said suction platen; and
   actuator means for displacing said carriage with respect to said frame in a direction generally parallel with the general plane of the uppermost unit in the stack such that the uppermost unit is displaced along with said carriage and separated from the stack.

2. Apparatus as set forth in claim 1 wherein said actuator means comprises a pneumatic cylinder assembly coupled between said suction platen and said frame.

3. Apparatus as set forth in claim 2 including means for coupling a source of pressurized air to said pneumatic cylinder assembly for displacing said suction platen in a direction generally toward said push block.

4. Apparatus as set forth in claim 1 including means for adjusting the position of said push block relative to said frame.

5. Apparatus as set forth in claim 1 including control means mounted on said frame for controlling vacuum engagement of said suction platen with the uppermost unit in the stack and for controlling operation of said actuator means.

6. Apparatus as set forth in claim 5 wherein said control means is operable to maintain said suction platen in vacuum engagement with the uppermost unit in the stack subsequent to separation of the uppermost unit from the underlying unit to permit lifting and carrying of the uppermost unit.

7. Apparatus as set forth in claim 1 wherein said frame includes a handle.

8. Apparatus as set forth in claim 1 wherein said suction platen is mounted at the underside of said carriage in a position extending generally transversely beneath said side plates, said suction platen including at least one downwardly open suction channel.

9. Apparatus as set forth in claim 1 including support means for supporting said push block with respect to at least one of said side plates, said support means being adjustable to permit adjustment in the vertical position of said push block with respect to said frame for bearing engagement of said push block with an edge of the unit immediately underlying the uppermost unit.

10. Apparatus as set forth in claim 1 wherein said actuator means comprises a fluid pressure-responsive cylinder assembly coupled between said frame and said carriage, and further including means for coupling a source of pressurized fluid to said cylinder assembly for displacing said carriage with respect to said frame.

11. Apparatus as set forth in claim 1 wherein said actuator means comprises a fluid pressure-responsive cylinder assembly coupled between said frame and said carriage, said cylinder assembly including means for biasing said carriage normally in a direction generally away from said push block, and further including means for coupling a source of pressurized fluid to said cylinder assembly for moving said carriage in a direction generally toward said push block.

12. Apparatus as set forth in claim 11 wherein said cylinder assembly comprises a cylinder housing and a piston slidably received within said housing and including a ram projecting from said housing, one of said housing and said ram being secured to said carriage and the other of said housing and said ram being secured to said frame, said biasing means comprising a spring reacting between said piston and said housing.

13. Apparatus as set forth in claim 11 including first control means on said frame for selectively coupling and uncoupling the source of vacuum from said suction platen, and second control means on said frame for selectively coupling and uncoupling the source of pressurized fluid from said cylinder assembly.

14. Apparatus as set forth in claim 13 wherein said first control means is normally biased toward a position coupling the source of vacuum to said suction platen, and wherein said second control means is normally biased toward a position uncoupling the source of pressurized fluid from said cylinder assembly.

15. Apparatus as set forth in claim 1 wherein the units are insulated glass window units.

* * * * *